Figure 1:
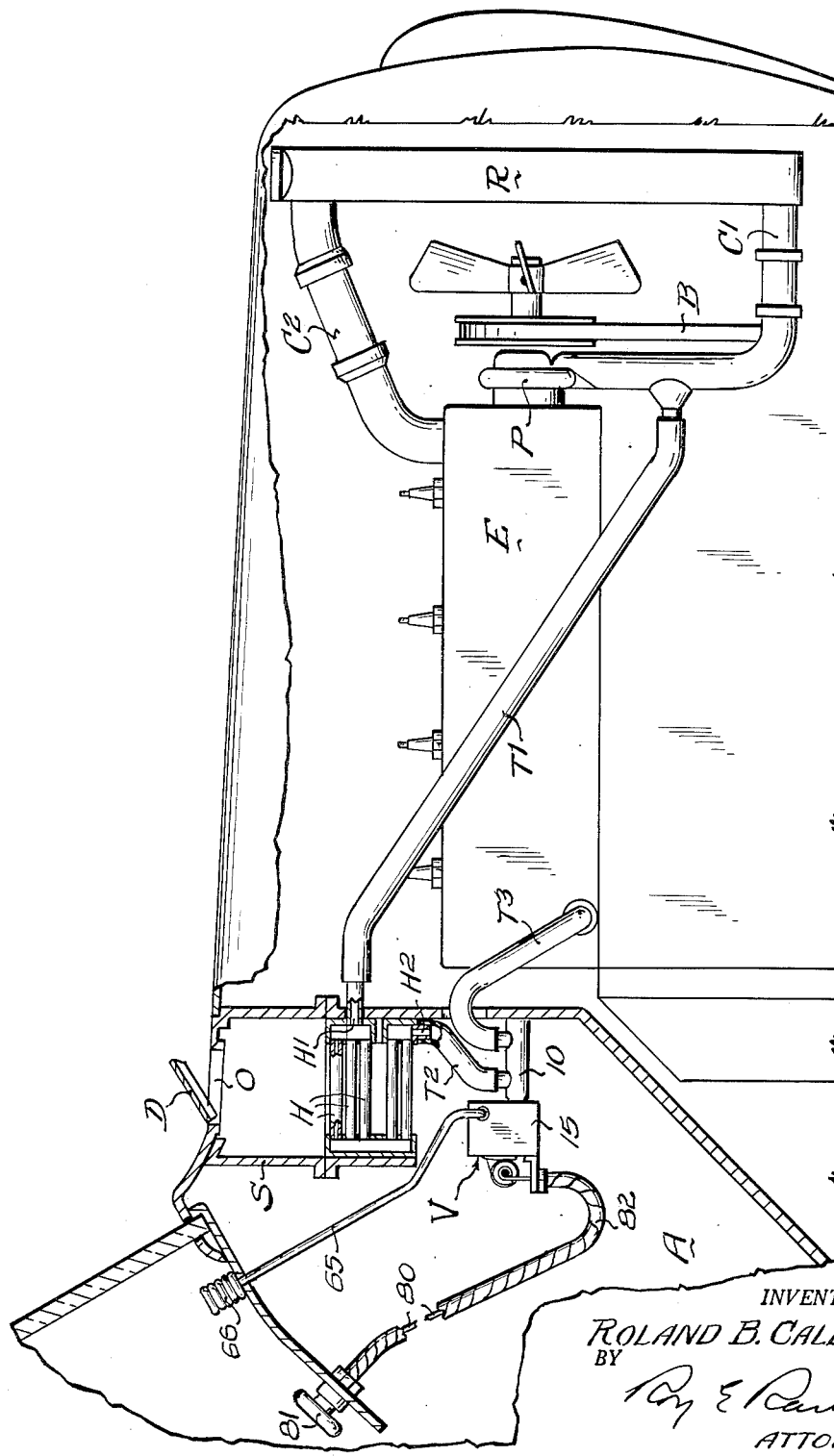

Jan. 23, 1962 R. B. CALDWELL 3,018,084
BALANCED VALVE
Filed Jan. 13, 1959 2 Sheets-Sheet 1

INVENTOR.
ROLAND B. CALDWELL
BY
ATTORNEY.

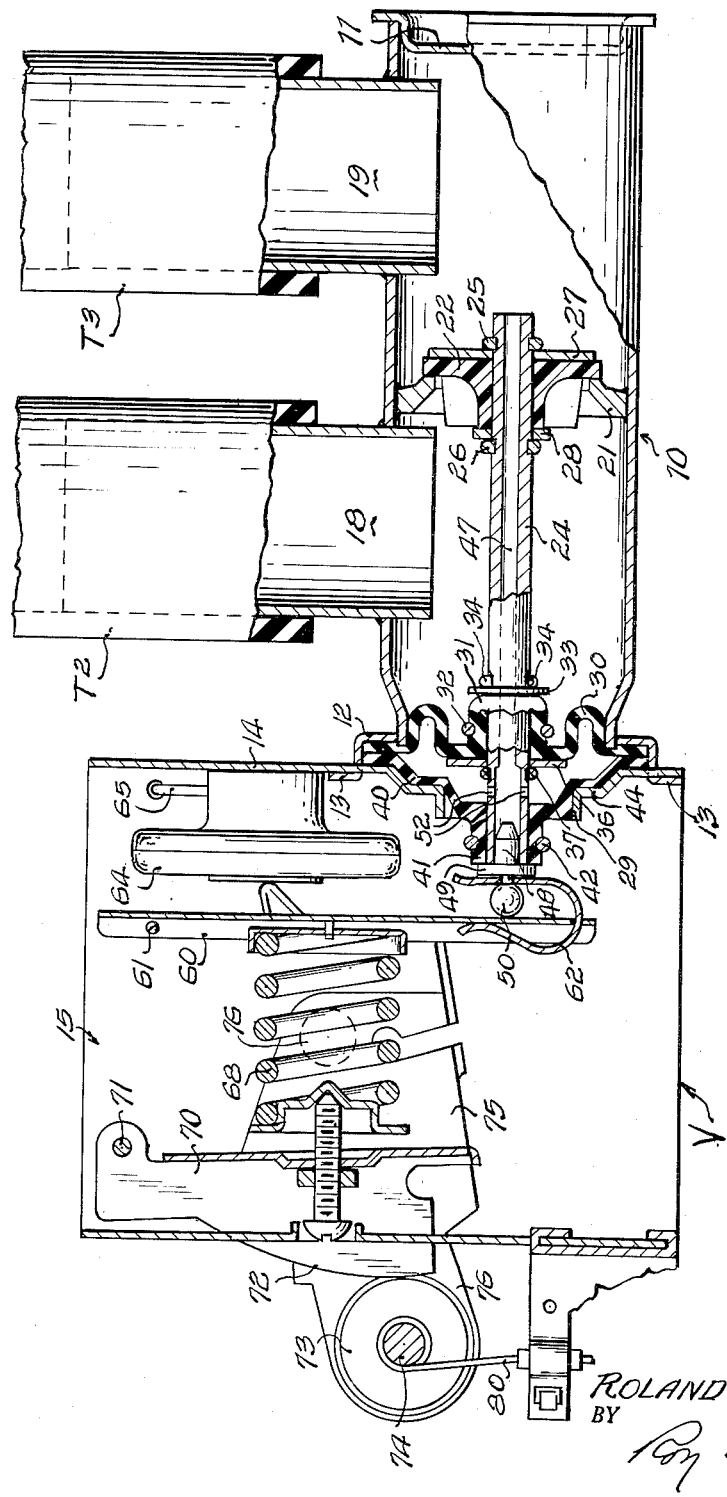

United States Patent Office 3,018,084
Patented Jan. 23, 1962

3,018,084
BALANCED VALVE
Roland B. Caldwell, Worthington, Ohio, assignor to Ranco Incorporated, Columbus, Ohio, a corporation of Ohio
Filed Jan. 13, 1959, Ser. No. 786,584
8 Claims. (Cl. 251—282)

The present invention relates to a liquid flow control valve for use in a closed liquid circulating system having internal liquid and vapor pressures, such as a thermostatically actuated valve in a sealed liquid cooling system of an internal combustion engine driven automobile to control the flow of the liquid through an air heater to maintain predetermined temperatures in the passenger compartment of the automobile.

It has been common practice to control the temperature in the passenger compartments of automobiles by thermostatically operated valves which regulate the flow of liquid from the cooling system of the engines through radiator type of heat exchangers over which air is passed and discharged into the compartments. The type of valves mentioned usually comprises a body or chamber including therein a valve seat and a poppet type valve closure member on a stem and movable to the seat against the liquid flow to throttle and cut off the flow, the stem extending through an opening in the valve chamber and being mechanically connected to a vapor filled expansible thermostatic element on the outside of the chamber, which element expands and contracts according to temperature influencing the element to actuate the valve member. To counteract the liquid pressure tending to open the valve, a flexible or movable wall is attached at its center to the valve stem and the periphery thereof is sealingly attached to the walls of the chamber about the stem opening therethrough so that the liquid pressure acts on the wall to bias the stem toward the valve closed position. Also, the wall forms a seal to prevent escape of liquid from the chamber.

In recent years, it has become the practice to seal the liquid cooling systems of automobile engines so that the vapor pressure inside the systems may increase up to 15 p.s.i. above atmospheric pressures. If the type of valve mentioned is employed in such systems this internal vapor pressure acts on the flexible wall and creates an additional valve closing force which is independent of the liquid pressure and which may vary considerably, depending on conditions in the engine and atmospheric temperatures. This additional valve closing force renders operation of the valve by a vapor filled thermal element impractical. Consequently, it has been the practice to actuate such valves by thermostatic elements of the liquid fill type which are relatively unaffected by variations in loads thereon, such as occasioned by the internal vapor pressure mentioned. The latter type of thermostatic elements, however, are unsatisfactory for various reasons, among which is the fact that they are slow to respond to temperature changes and their movement per degree of temperature change is slight as compared to the vapor fill type thermal elements.

The main object of the present invention is the provision of a balanced valve for use in liquid systems of the type mentioned in which the pressure of the liquid is utilized to tend to close the valve but the effect of the vapor pressure in the system on the valve is substantially cancelled so that a vapor filled expansible type thermal element may be employed to actuate the valve and maintain accurate temperature control.

A more specific object of the invention is the provision of a balanced valve comprising a valve chamber having an inlet and outlet and a valve seat intermediate the inlet and outlet, a valve member movable upstream of the flow through the valve to close on the seat, a valve member actuator or stem extending through an opening in the wall of the chamber in the inlet side of the valve, two adjacent movable or flexible walls each hermetically sealed to the actuator and to the walls about the opening, the inner seal being subjected to the liquid pressure in the upstream side of the valve so as to tend to move the actuator and valve member against the liquid flow, the outer seal being rigidly backed to limit movement of a substantial portion thereof, and means forming a passage from the downstream side of the valve to the space between the two seals whereby the internal vapor pressure of the system is present on opposite sides of the inner seal to thereby substantially cancel out the effect of the vapor pressure on the inner seal.

Other objects and advantages of the invention will be apparent from the following description of a preferred embodiment of the invention, reference being made to the accompanying drawings wherein FIG. 1 is a schematic view, partly in section, of a passenger automobile having a cooling system and a hot water type air heater installed therein for heating the air in the passenger compartment, the liquid flow through the heater being controlled by the improved valve; and FIG. 2 is a fragmentary sectional view showing a portion of the improved heater control valve.

It will be understood that the improved valve construction can be employed in any form of liquid circulating system, but in its preferred form it is employed to control the flow of liquid of the cooling system of an automobile engine through an air heater located in the passenger compartment of the automobile. Referring to the drawings, an automobile indicated generally at A is shown which includes a water cooled type internal combustion engine E, which may be of conventional construction including the usual water jacket surrounding the cylinders of the engine, a radiator R in front of the engine, conduits C1 and C2 through which water is circulated from the cooling jacket through the radiator R and returned to the water jacket, the water being circulated by a pump P driven by the fan belt B, as is well understood in the art.

The cowl of the automobile has an opening O therein and a deflector D is provided to deflect air downwardly into the interior of the passenger compartment through the opening when the automobile moves forward, as is well understood in the art. An air chute S is in alignment with opening O and a conventional radiator type air heater H is attached to the lower end of chute S for heating the air as it is forced downwardly into the passenger compartment. A blower, not shown, could be employed to move air downwardly through the heater and into the compartment.

The heater H may be of any conventional construction and includes opposed headers connected by a series of tubes, which headers include an inlet H1 and an outlet H2 for circulation of liquid from the cooling jacket through the heater. Inlet H1 is connected to conduit C1 by a tube T1, and outlet H2 has a tube T2 connected thereto leading to the inlet of a thermostatically controlled valve V. The outlet of valve V has a tube T3 connected therewith for discharging liquid from the heater into the cooling jacket of the engine. It is to be understood that the cooling jacket is arranged to be sealed to the atmosphere by means well known in the art so that the vapor pressure within the system may reach as high as 15 p.s.i. above atmospheric pressures, for example.

Referring now to the construction of valve V, a valve body or chamber 10 is provided which is preferably formed of a metal tubular section closed at one end by a plug 11 brazed therein, and the opposite end has a clamping ring 12 brazed thereto which has out-turned lugs 13 extending through openings, not shown, in a mounting plate 14 forming one wall of a housing 15, which lugs are turned down to clamp the body to the plate. An inlet tube 18 and an outlet tube 19 are brazed in spaced openings in body 10, and an annular valve seat 21, having a round port therethrough, is brazed in the body intermediate the inlet and outlet openings. A poppet type valve member 22 is arranged to move relative to seat 21 to control the flow of liquid from the inlet through the port of the seat to the outlet of the valve.

Valve member 22 is preferably formed of a suitable plastic, such as nylon, and has an axial opening therethrough in which a valve stem 24 is hermetically attached, member 22 being secured to the stem by split rings 25 and 26 resiliently retained in annular grooves at opposite ends of member 22, washers 27 and 28 being interposed between the rings and the valve member.

The left hand end of stem 24 projects from the open end of body 10, which open end, it will be noted, is on the inlet or upstream side of seat 21, and through a necked opening 29 through plate 14. A circular corrugated flexible inner wall or seal 30 has its peripheral edges sealingly clamped between ring 12 and plate 14, and the central portion of the seal has a neck 31 through which stem 24 extends. Neck 31 is sealingly clamped about stem 24 by a wire 32. Neck 31 of seal 30 is backed by a metal washer 33 which is maintained against the right hand end of the neck by lugs 34 provided by deforming stem 24, and a washer 36 is maintained against the left hand side of the seal by lugs 37 formed from the stem similarly to lugs 34.

An outer movable wall or seal in the form of a circular flexible member 40 of material like that of seal 30 has its peripheral portions abutting those of seal 30 so that the outer edges of the two seals are firmly clamped together to provide a fluid tight joint by the clamping action of ring 12 and housing plate 14 brough about when lugs 13 are turned over against the face of plate 14 in the assembly of the valve mechanism. Seal 40 has a neck 41 through which stem 24 extends, and the neck is sealingly attached to the stem by a clamp wire 42. The major portion of seal 40 is rigidly backed by an annular inset portion 44 of plate 14, the opening 29 being formed through the central port of this inset.

Stem 24 is hollow, having an axial bore 47 therethrough, and the left hand end thereof is closed by a plug 48 having a collar 49 and a ball 50 formed thereon. A pair of bleed holes 52 are formed by a cross bore through the portion of stem 24 between seals 30 and 40 so that the area between the seals is in communication with the downstream side of the valve body through the stem which opens on the downstream side of valve member 22. Thus, the only pressure existing between the seals will be the vapor pressure in the cooling system.

It will be understood that when the automobile engine E is operating, pump P forces liquid through tube T1 to heater H and thence to the inlet 18 of valve V and the liquid pressure exerts a force against valve member 22 tending to open the same. This force is opposed by the liquid pressure tending to urge seal 30 to the left, and it will be observed that the effective area of the seal exposed to the liquid pressure is somewhat greater than the area of the opening through seat 21 so that the valve is urged to a closed position by the liquid pressure. As the engine becomes warm, the vapor pressure in the cooling system rises and this pressure exists throughout the entire system and on both the upstream and downstream side of valve seat 21. Thus, while the liquid pressure in the inlet of the valve acts on seal 30 to tend to close the valve as described, the vapor pressure in the system is the same on opposite sides of seal 30 and therefore the effect of this pressure on seal 30 is cancelled out. The vapor pressure in the liquid system also acts against seal 40 to tend to move stem 24 and valve 22 to the valve closing position, but it will be seen that portion 44 of plate 14 rigidly backs the major area of seal 40 so that the effective area of this seal exposed to the atmosphere is the area of opening 29. As a practical matter the effect of the internal pressure on the area of seal 40 exposed to the atmosphere is not sufficient to disrupt operation of the valve by a vapor filled thermal element.

Valve stem 24 may be actuated by any suitable means, and in the embodiment shown it is actuated by a lever 60 which is pivoted on a pin 61 journaled in opposite walls of housing 15. Stem 24 is resiliently held to the swinging end of lever 60 by a C-shaped spring 62, one leg of which is slotted to receive the neck portion between ball 50 and collar 49 and the opposite leg of the spring engages lever 60. Lever 60 is moved clockwise to close valve member 22 on seat 21 by expansion of a suitable vapor filled expansible element 64, which may be of any conventional construction, such as two resilient, flexible metal dish-shape members joined to form a hollow expansible chamber. A tube 65 is connected at one end with the interior of element 64 and the other end is closed and the closed end portion is coiled at 66. The element 64 and tube 65 contain a suitable vapor, such as sulphur dioxide, which as is well known in the art, provides a pressure inside the element corresponding to the coolest portion of the element or tube according to the vapor pressure curve of sulphur dioxide. The bulb 66 may be located in any suitable point at which a representative temperature is desired to be maintained, and as an example it is shown on the instrument panel. The lever 60 is loaded to oppose expansion of element 64 by a compression spring 68 which is arranged to urge the lever counterclockwise. Preferably, spring 68 is adjustable to vary the load of the lever on element 64 and therefore the temperature at which valve 22 closes on seat 21, and this adjustment is effected by a lever 70 pivoted in housing 15 by a pin 71, which lever includes a cam portion 72 projecting through a slot in the adjacent housing wall and engaging a roller 73 journaled on a post 74 attached to an arm 75 pivoted to a side wall of the housing at 76 and also projecting through the slot mentioned. By swinging arm 75, lever 70 is moved to increase or decrease the length of spring 68 and thereby vary the load against which element 64 must move to close valve member 22 on seat 21. The construction of the spring adjusting mechanism and the connection of lever 60 with stem 24 is more fully shown and claimed in U.S. Patent 2,538,212.

Lever 75 is positioned manually by a wire 80 having a knob 81 attached at one end and extending through an opening in the instrument panel and through a sheath 82 to post 74. Sheath 82 is attached at one end to the rear side of the instrument panel and the other end is attached to a bracket on housing 15.

It will be seen that by the present invention the liquid pressure in the cooling system can be used to provide a valve closing force by acting on the inner seal 30 but which seal has the internal vapor pressure of the system on opposite sides thereof so that this pressure has no effect on movement of the valve by this seal.

Although the invention has been described with reference to the control of a heater for passenger compartments of internal combustion automobiles it will be appreciated that the valve could be employed in other systems wherein regulation of the flow of fluid may be effected by the presence of internal pressures as well as by pressure upon liquid in the system.

It is to be further understood that changes, modifications and other adaptations of the invention might be made all falling within the scope of the claims which follow.

I claim:

1. In an internal combustion engine driven vehicle having a sealed liquid circulating heat exchange system for cooling the engine, valve means to control flow of liquid in said system comprising a valve body having an opening in one end thereof, a liquid inlet spaced from said opening inwardly from said end of said body, a liquid outlet and a valve port between said inlet and said outlet, a valve member movable to and from said port for controlling the liquid flow through said body, connecting means extending through said opening in said body for moving said valve member, two fluid impervious confronting movable walls having substantially equal opposed areas forming hermetic seals between the walls of said body about said opening through said body and said connecting means, and means to maintain fluid pressure between said walls comprising a fluid passage from the downstream side of said valve port to the space between said movable walls, said passage providing the only communication with said space.

2. In an internal combustion engine driven vehicle having a sealed liquid circulating heat exchange system for cooling the engine, valve means to control flow of liquid in said system comprising a valve body having an opening in one end thereof, a liquid inlet spaced from said opening inwardly from said end of said body, a liquid outlet and a valve port between said inlet and said outlet, a valve member movable to and from said port for controlling the liquid flow through said body, connecting means extending through said opening in said body for moving said valve member, two fluid impervious confronting flexible walls having substantially equal opposed areas forming hermetic seals between the walls of said body about said opening through said body and said connecting means, means to maintain fluid pressure between said walls comprising a fluid opening from the downstream side of said valve port to the space between said flexible walls, and a rigid wall forming a backing for a substantial area of the outer one of said flexible walls relative to the interior of said body.

3. In an internal combustion engine driven vehicle having a sealed liquid circulating heat exchange system for cooling the engine, valve means to control flow of liquid in said system comprising a valve body having an opening in one end thereof, a liquid inlet spaced from said opening inwardly from said end of said body, a liquid outlet and a valve port between said inlet and said outlet, a valve member movable to and from said port for controlling the liquid flow through said body, connecting means extending through said opening in said body for moving said valve member, and two fluid impervious confronting movable walls having substantially equal opposed areas forming hermetic seals between the walls of said body about said opening through said body and said connecting means, said connecting means having a fluid passage having one end opened to the downstream side of said valve port and the other end open to the space between said movable walls, said passage being always open to provide fluid communication with said space.

4. In an internal combustion engine driven vehicle having a sealed liquid circulating heat exchange system for cooling the engine, valve means to control flow of liquid in said system comprising a valve body having an opening in one end thereof, a liquid inlet spaced from said opening inwardly from said end of said body, a liquid outlet and a valve port between said inlet and said outlet, a valve member on the downstream side of said port and movable to and from said port for controlling the liquid flow through said body, a hollow stem connected to said valve member and extending through said opening in said body for moving said valve member, two fluid impervious spaced confronting movable walls hermetically sealed to the walls of said body about said opening through said body and having openings through which said stem projects, and means to seal the edges of said openings to said stem, said stem being open to the downstream side of said port and having an opening between said confronting walls and the space therebetween, said hollow stem providing the only communication with the space between said movable walls.

5. In an internal combustion engine driven vehicle having a sealed liquid circulating heat exchange system for cooling the engine, valve means to control flow of liquid in said system comprising a valve body having an opening in one end thereof, a liquid inlet spaced from said opening inwardly from said end of said body, a liquid outlet and a valve port between said inlet and said outlet, a valve member movable to and from said port for controlling the liquid flow through said body, connecting means extending through said opening in said body for moving said valve member, two parallel spaced fluid impervious flexible walls forming hermetic seals between the walls of said body adjacent to said opening in said body and said connecting means, means forming a fluid opening from the downstream side of said valve port to the space between said movable walls, and a rigid wall forming a backing for a substantial area of the outer one of said flexible walls.

6. A valve comprising a body having an opening in one end thereof, a fluid inlet spaced from said opening inwardly from said end of said body, a fluid outlet, a valve port between said inlet and said outlet, a valve member movable to and from said port for controlling said fluid flow through said body, connecting means extending through said opening for moving said valve member, the open end of said body being substantially closed by two fluid impervious confronting movable walls having substantially equal opposed areas and forming hermetic seals between the walls of said body about said opening and said connecting means, and means to maintain fluid pressure between said walls comprising a fluid passage from the downstream side of said valve port relative to said inlets and outlets and leading to the space between said movable walls, said passage being always open and providing the sole path for conveying fluid to and from the space between said walls.

7. A valve comprising a body having an opening in one end thereof, a fluid inlet spaced from said opening inwardly from said end of said body, a fluid outlet, a valve port between said inlet and outlet, a valve member movable to and from said port for controlling fluid flow through said body, connecting means extending through said opening in said body for moving said valve member, two fluid impervious flexible walls arranged in confronting relationship and having substantially equal opposed areas and forming hermetic seals between the walls of said body about said opening and said connecting means, means to maintain fluid pressure between said walls comprising a fluid passage leading from the downstream side of said valve port relative to said inlet and outlet and opening into the space between said flexible walls, and a rigid wall forming a backing for a substantial area of the outer one of said flexible walls relative to the interior of said body.

8. Valve means comprising a body having an opening in one end thereof, a fluid inlet spaced from said opening inwardly from said end of said body, a fluid outlet, a valve port between said inlet and outlet, a valve member on the downstream side of said port relative to said inlet and outlet and movable to and from said port for controlling the fluid flow through said body, a hollow stem connected to said valve member and extended through said opening for moving said valve member, two fluid impervious confronting movable walls hermetically sealed to the walls of said body about said opening and having openings through which said stem projects, and means to seal the edges of said openings to said stem, said stem being open to the downstream side of said port and having an opening between said confronting walls and the space therebetween, said hollow stem being always open for providing the sole means for conveying fluid to and from said space between said walls.

References Cited in the file of this patent

UNITED STATES PATENTS

| | | |
|---|---|---|
| 1,237,981 | Webster | Aug. 21, 1917 |
| 1,800,995 | Gaunt | Apr. 14, 1931 |
| 2,715,009 | Beekley | Aug. 9, 1955 |
| 2,743,872 | Wood | May 1, 1956 |